United States Patent
Chihara

(10) Patent No.: US 7,221,879 B2
(45) Date of Patent: May 22, 2007

(54) DRIVER MANAGEMENT METHOD, DRIVER MANAGEMENT APPARATUS AND PROGRAM FOR DRIVER MANAGEMENT

(75) Inventor: Tatsuya Chihara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 184 days.

(21) Appl. No.: 10/961,257

(22) Filed: Oct. 12, 2004

(65) Prior Publication Data

US 2005/0207763 A1 Sep. 22, 2005

(30) Foreign Application Priority Data

Mar. 17, 2004 (JP) .............................. 2004-076903

(51) Int. Cl.
*G03G 15/00* (2006.01)
*G03G 21/00* (2006.01)

(52) U.S. Cl. .............................. 399/24; 347/19; 399/8

(58) Field of Classification Search .................. 399/24, 399/8, 25, 26, 27; 358/1.15; 347/19
See application file for complete search history.

(56) References Cited

U.S. PATENT DOCUMENTS

| | | | |
|---|---|---|---|
| 2004/0085565 A1 * | 5/2004 | Owen et al. | 399/24 |
| 2004/0135838 A1 * | 7/2004 | Owen et al. | 347/19 |
| 2004/0156056 A1 * | 8/2004 | Sawada | 358/1.2 |
| 2005/0276618 A1 * | 12/2005 | Clement et al. | 399/24 |

FOREIGN PATENT DOCUMENTS

| | | | |
|---|---|---|---|
| JP | 11-165451 | | 6/1999 |
| JP | 2004-235769 A | * | 8/2004 |

* cited by examiner

*Primary Examiner*—Sophia S. Chen
(74) *Attorney, Agent, or Firm*—Oliff & Berridge, PLC

(57) ABSTRACT

A driver management method for managing a driver that is used when an output apparatus is used from a terminal apparatus, includes monitoring a state of the output apparatus, and restricting availability of the driver according to the state of the output apparatus.

18 Claims, 5 Drawing Sheets

DRIVER MANAGEMENT METHOD, DRIVER MANAGEMENT APPARATUS AND PROGRAM FOR DRIVER MANAGEMENT

BACKGROUND OF THE INVENTION

1. Field of the invention

The present invention relates to a driver management method, a driver management apparatus, and a program for driver management, and more particularly to a driver management method, a driver management apparatus, and a program for driver management that manage a driver of an output apparatus according a state of the output apparatus.

2. Description of the Related Art

Various consumables are used in an output apparatus such as a printer. These consumables include paper, toners, inks, drums, and staples. It is necessary to supply these consumables as needed when the output apparatus is in use.

There are upper limits for the quantity of the consumables that can be supplied in the output apparatus. As a result, in some usage of the output apparatus, there may be a case in which the consumables cannot be supplied sufficiently to the output apparatus. In such a case, the output apparatus becomes useless due to the lack of the consumables. Thus, it may occur that a job of a high importance cannot be executed due to a frequent execution of jobs of low importance.

In view of the foregoing problem, a technique has been proposed in which the consumption of consumables having limited quantity is restrained by providing an output apparatus with a user list so that the output apparatus checks the priority of print jobs in terms of consumables on the user list when warning for a shortage of the consumables is issued, suspends an output of a print job of less priority, and notifies the terminal apparatus which has issued the print job of the suspension of the print job output (refer to Japanese patent application publication No. 11-165451).

In the Japanese patent application publication No. 11-165451, however, since the output apparatus is provided with the user list to determine whether or not the printing is performed, there are such problems that the cost of the output apparatus is increased because a memory resource is required for holding the user list, and a user cannot know whether the printing is performed before issuing the print job. Further, when this technique is applied to a network printer, a job which is not to be printed is transmitted over a network, resulting in an increase in a unnecessary network traffic.

SUMMARY OF THE INVENTION

The present invention has been made in view of the above circumstances and provides a driver management method, a driver management apparatus, and a program for driver management which enable efficient use of consumables of an output apparatus by causing a terminal apparatus to determine whether or not the output apparatus can perform printing, and then, to restrict availability of a driver of the output apparatus according to a determination result.

In a first aspect of the present invention, a driver management method for managing a driver that is used when an output apparatus is used from a terminal apparatus, comprises monitoring a state of the output apparatus; and restricting availability of the driver according to the state of the output apparatus.

In another aspect of the present invention, a driver management apparatus for managing a driver that is used when an output apparatus is used from a terminal apparatus, comprises a monitoring section that monitors a state of the output apparatus; and a availability restricting section that restricts availability of the driver according to the state of the output apparatus monitored by the monitoring section.

In still another aspect of the present invention, a program for driver management executable by a computer to perform a function for managing a driver that is used when an output apparatus is used from a terminal apparatus, the function comprising the steps of monitoring a state of the output apparatus; and restricting availability of the driver according to the state of the output apparatus monitored by the monitoring process.

According to the present invention, with a configuration in which the state of the output apparatus is monitored, and then, the availability of the driver of the output apparatus is restricted according to the monitored state, it is possible for a user to know whether the printing can be performed prior to issuing a job, and therefore to prevent an unnecessary job from being issued.

BRIEF DESCRIPTION OF THE DRAWINGS

Embodiments of the present invention will be described in datail based on the following figures, wherein.

DETAILED DESCRIPTION OF THE EMBODIMENTS

A detailed description will now be given of embodiments of a driver management method, a driver management apparatus, and a program for driver management according to the present invention with reference to the accompanying drawings.

[Embodiment 1]

Figure 1:
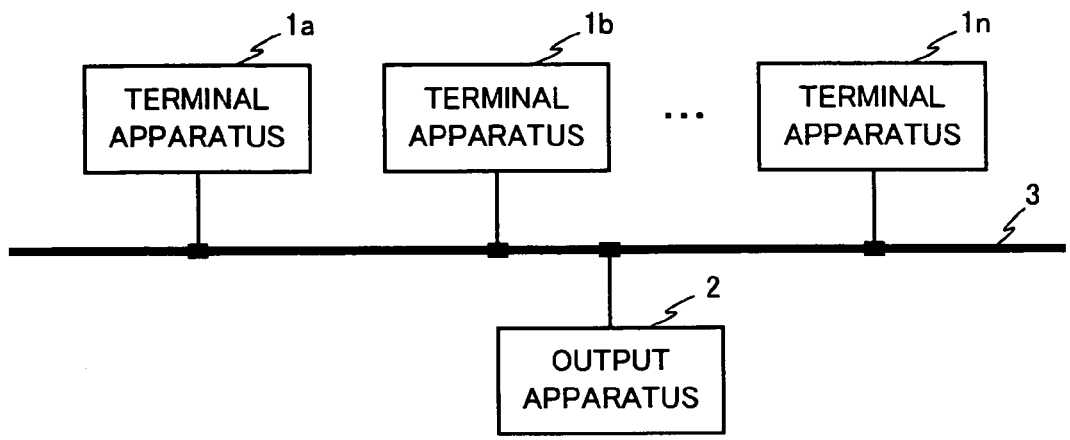
FIG. 1 illustrates a configuration of a network including terminal apparatuses to which the present invention is applied.

FIG. 1 illustrates a configuration of a network including terminal apparatuses to which the present invention is applied. In the configuration illustrated in FIG. 1, plural terminal apparatuses 1 (1a through 1n) and an output apparatus 2 are connected with each other through a network 3.

The terminal apparatus 1 may be a PC (Personal Computer) used by a user, which carries out various steps by executing application software in addition to performing operations according to the present invention. In the terminal apparatus 1, a driver for the output apparatus 2 is installed. The output apparatus 2 is an apparatus such as a printer carrying out print processing.

Various types of apparatuses, which are not illustrated, may be connected to the network 3.

A description will now be given of configurations of the terminal apparatus 1 and the output apparatus 2. The configuration of the output apparatus 2 is described first.

Figure 2:
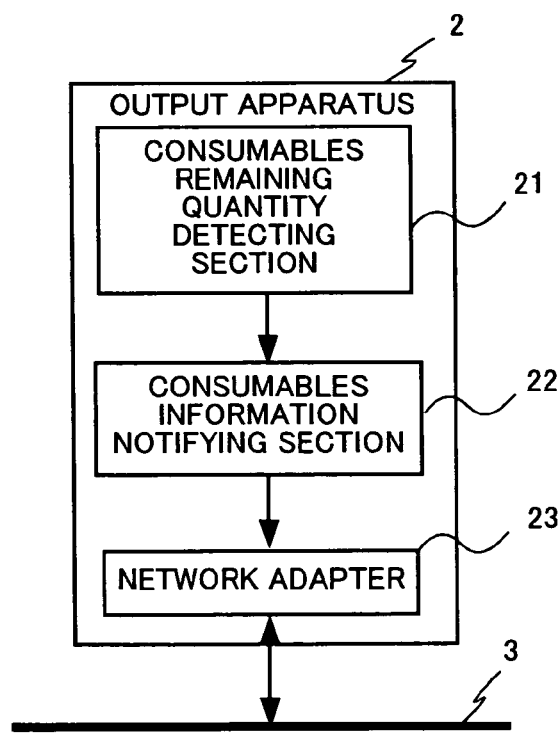
FIG. 2 is a block diagram illustrating a functional configuration of an output apparatus.

FIG. 2 is a block diagram illustrating the functional configuration of the output apparatus 2. Although FIG. 2 illustrates only a part of the configuration of the output apparatus 2, the configuration also includes respective functional sections that carry out reception of jobs and print processing.

Referring to FIG. 2, the output apparatus 2 is constituted by a consumables remaining quantity detecting section 21, a consumables information notifying section 22, and a network adapter 23. The consumables remaining quantity detecting section 21 detects remaining quantities of consumables (such as toners, paper, and staples) in the output apparatus 2. The consumables information notifying section 22 notifies the terminal apparatus 1 of information on consumables including the remaining quantities of the consumables detected by the consumables remaining quantity detecting section 21 and information on types of the consumables currently set. The network adapter 23 serves as an interface with the network 3, and receives various information including the information on consumables notified by the consumables information notifying section 22 through the network 3.

It should be noted that the configurations of the consumables remaining quantity detection section 21 and the consumables information notifying section 22 are not configurations specific to the present invention, and are similar to configurations in conventional printers and the like which transmit remaining quantities of consumables to a terminal apparatus.

Figure 3:
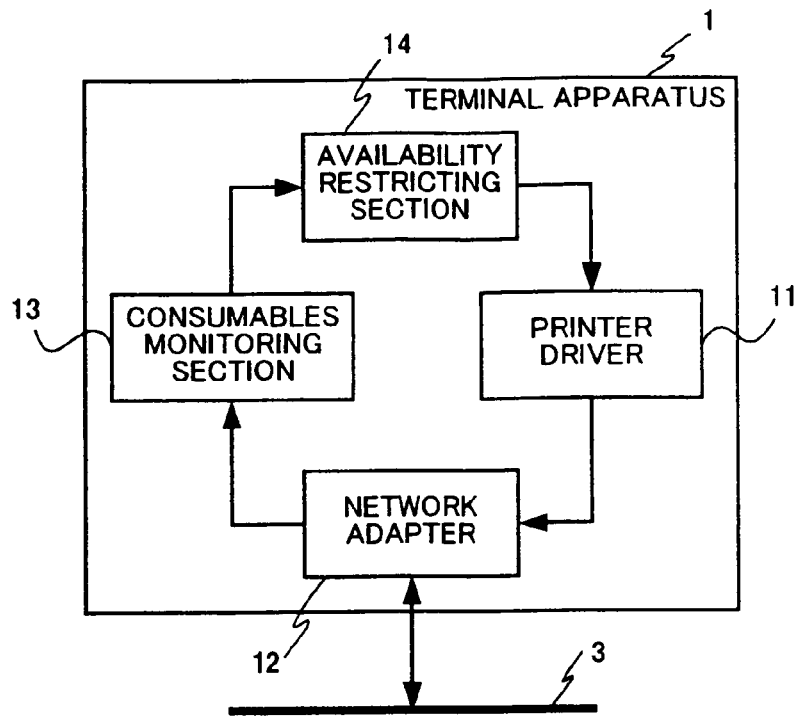
FIG. 3 is a block diagram illustrating a functional configuration of a terminal apparatus.

A description will now be given of a configuration of the terminal apparatus 1. FIG. 3 is a block diagram illustrating the functional configuration of the terminal apparatus 1. FIG. 3 illustrates only a part of the configuration of the terminal apparatus 1, and the configuration also includes respective functional sections like a conventional terminal apparatus.

Referring to FIG. 3, the terminal apparatus 1 is constituted by a printer driver 11, a network adapter 12, a consumables monitoring section 13, and an availability restricting section 14.

The printer driver 11 generates a job that instructs printing based on data output by application software and the like, not illustrated, and transmits the generated job to the network 3 through the network adapter 12. The network adapter 12 serves as an interface with the network 3, transmits the job generated by the printer driver 11, and transmits/receives various information including reception of the information on consumables notified by the output apparatus 2.

The consumables monitoring section 13 extracts the information on consumables from the various information received by the network adapter 12, and notifies the availability restricting section 14 of respective information such as the remaining quantities of the consumables contained in the extracted information on consumables. The availability restricting section 14 determines possibility of the print on the output apparatus 2 based on the information notified by the consumables monitoring section 13, and restricts the availability of the printer driver 11 according to a determination result. The consumables monitoring section 13 and the availability restricting section 14 may be constituted by causing the terminal apparatus 1 to execute a program according to the present invention.

Figure 4:
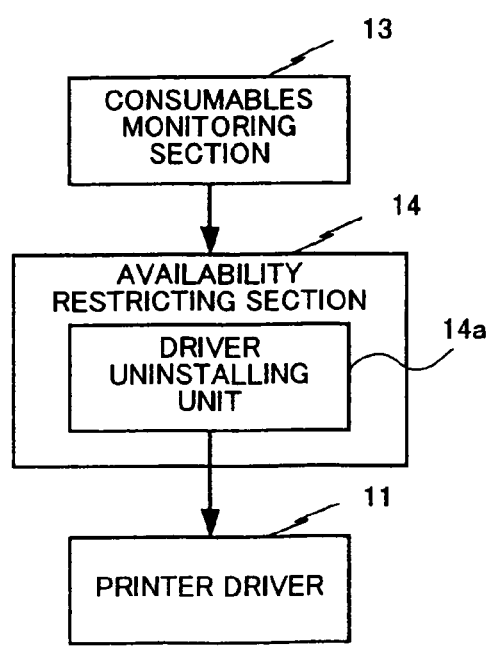
FIG. 4 is a block diagram illustrating a functional configuration of an availability restricting section according to an embodiment.

The availability restricting section 14 includes a driver uninstalling unit 14a that uninstall the printer driver 11 as illustrated in FIG. 4.

Figure 5:
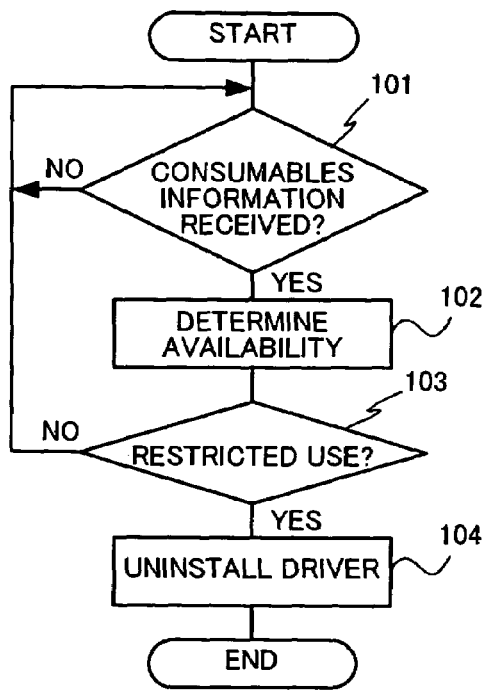
FIG. 5 is a flowchart illustrating a flow of an operation of the terminal apparatus.

A description will now be given of an operation of the terminal apparatus 1. FIG. 5 is a flowchart illustrating a flow of the operation of the terminal apparatus 1.

In the terminal apparatus 1, if the consumables monitoring section 13 receives the information on consumables that is notified by the output apparatus 2 through the network adapter 12 ("YES" in a step 101), the availability restricting section 14 determines the availability of the output apparatus 2 based on the information on consumables (step 102).

The determination by the availability restricting section 14 is carried out such that if the remaining quantity of a specific consumables is equal to or less than a certain value, if the remaining quantity of the toner is 5% or less, for example, the use of the output apparatus 2 is prohibited. It should be noted that the types and the remaining quantities of the consumables may be arbitrarily specified, and may be specified differently depending on the respective terminal apparatuses 1. Also, in addition to the determination based on the remaining quantities of the consumables, the use of the output apparatus 2 may be prohibited based on the type of the consumables. For example, if an inappropriate type of the toner is used, the use of the output apparatus 2 may be prohibited. Thus, it is possible to avoid a generation of a failure of the output apparatus 2 due to a use of an inappropriate consumables.

If the availability restricting section 14 does not prohibit the use of the output apparatus 2 ("NO" in a step 103), the procedure returns to the step 101, and waits for the reception of another consumables information. On the other hand, if the availability restricting section 14 prohibits the use of the output apparatus 2 ("YES" in the step 103), the driver uninstalling unit 14a uninstalls the printer driver 11 (step 104), and the procedure is completed.

If the printer driver 11 is uninstalled, the terminal apparatus 1 cannot use the output apparatus 2.

Further, the use of the output apparatus 2 may be prohibited according to a state of the output apparatus 2 such as an occurrence of a serious failure of the output apparatus 2.

[Embodiment 2]

In an embodiment 2, a description will be given of a configuration in which the availability restricting section 14 in the embodiment 1 is replaced with an availability restricting section 14'. Configurations other than that of the availability restricting section 14' are the same as those of the embodiment 1, and therefore, the description will be given of a configuration of the availability restricting section 14' and an operation of the terminal apparatus 1 using the availability restricting section 14'.

Figure 6:
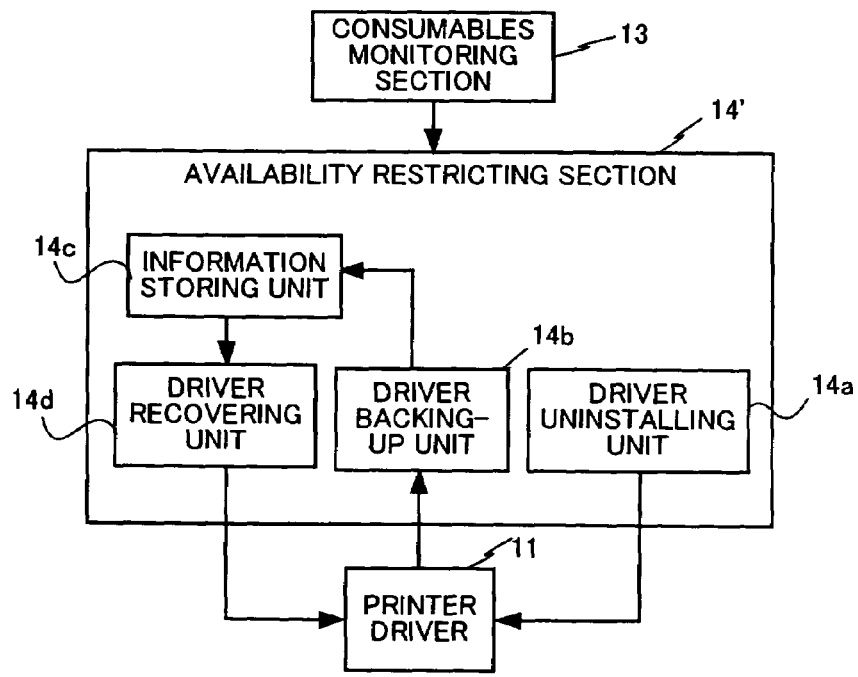
FIG. 6 is a block diagram illustrating a functional configuration of an availability restricting section according to another embodiment.

FIG. 6 is a block diagram illustrating the functional configuration of the availability restricting section 14'. As illustrated in FIG. 6, the availability restriction section 14' is constituted by a driver uninstalling unit 14a, a driver backing-up unit 14b, an information storing unit 14c, and a driver recovering unit 14d.

The driver uninstalling unit 14a uninstalls the printer driver 11. The driver backing-up unit 14b duplicates a group of files constituting the printer driver 11, and setting information of the printer driver 11, and stores the duplicated group of files and setting information to the information storing unit 14c. The information storing unit 14c stores and maintains the group of files and setting information stored by the driver backing-up unit 14b. The driver recovering unit 14d recovers the printer driver 11 based on the group of files and setting information stored in the information storing unit 14c.

Figure 7:
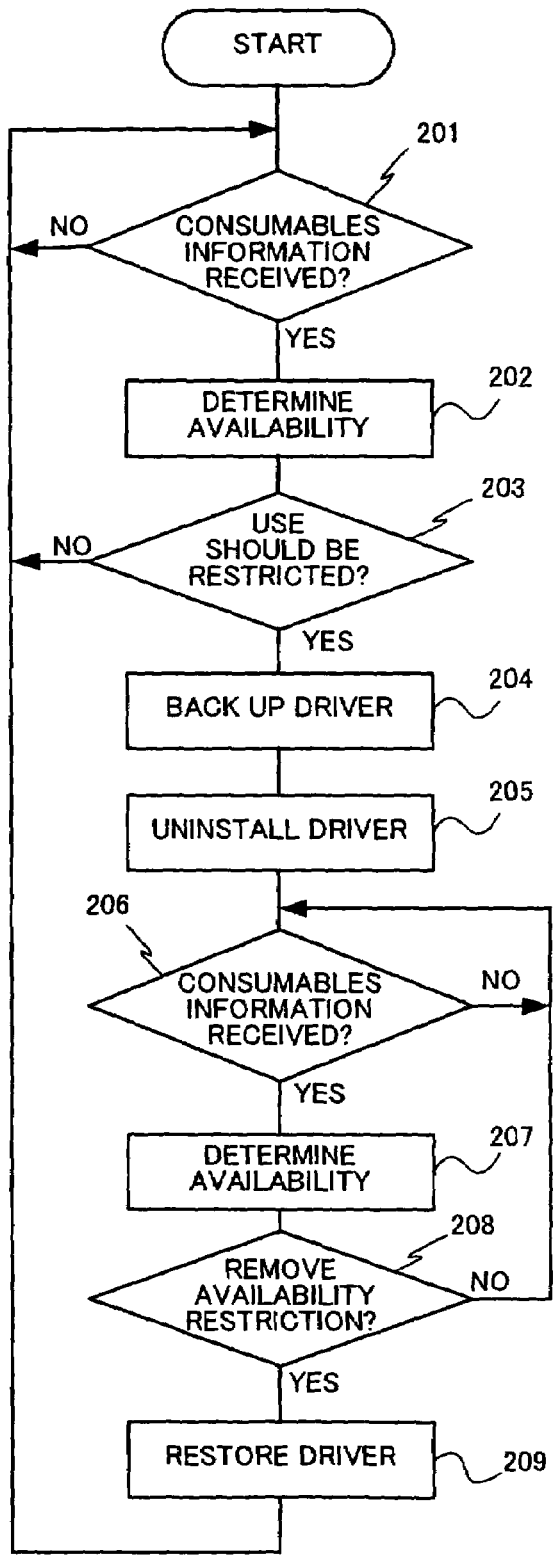
FIG. 7 is a flowchart illustrating a flow of an operation of the terminal apparatus according to another embodiment.

A description will now be given of the operation of the terminal apparatus 1. FIG. 7 is a flowchart illustrating a flow of the operation of the terminal apparatus 1 according to the embodiment 2.

Referring to FIG. 7, in the terminal apparatus 1, if the consumables monitoring section 13 receives the information on consumables notified by the output apparatus 2 through the network adapter 12 ("YES" in a step 201), the availability restricting section 14' determines the availability of the output apparatus 2 based on the information on consumables (step 202). The determination by the availability restricting section 14' is similar to the determination by the availability restricting section 14 in the embodiment 1.

If the availability restricting section 14' does not prohibit the use of the output apparatus 2 ("NO" in a step 203), the procedure returns to the step 201, and waits for the reception of another information on consumables. On the other hand, if the availability restricting section 14' prohibits the use of the output apparatus 2 ("YES" in the step 203), the driver backing-up unit 14b backs up the printer driver 11 (step 204), and the driver uninstalling unit 14a then uninstalls the printer driver 11 (step 205). Then, the consumables monitoring section 13 waits for the reception of another information on consumables notified by the output apparatus 2 ("NO" in a step 206).

Then, if the consumables monitoring section 13 receives the information on consumables notified by the output apparatus 2 through the network adapter 12 ("YES" in the step 206), the availability restricting section 14' determines the availability of the output apparatus 2 based on the information on consumables (step 207). The determination by the availability restricting section 14' is similar to the determination by the availability restricting section 14 in the embodiment 1.

If the availability restricting section 14' prohibits the use of the output apparatus 2, namely, determines continuation of the restriction on the availability ("NO" in a step 208), the procedure returns to the step 206, and waits for the reception of another information on consumables. On the other hand, if the availability restricting section 14' does not prohibit the use of the output apparatus 2, namely determines removal of the restriction on the availability ("YES" in the step 208), the driver recovering unit 14d recovers the printer driver 11 based on the group of files and setting information stored in the information storing unit 14c (step 209). Then, the procedure returns to the step 201, and waits for the reception of another information on consumables.

In this procedure, the printer driver 11 does not exist until the printer driver 11 is recovered in the step 209 after the printer driver 11 is uninstalled in the step 205. Therefore, the terminal apparatus 1 cannot use the output apparatus 2 during this period. If the printer driver 11 is recovered in the step 209, the terminal apparatus 1 can use the printer driver 11 again in the setting similar to the previous setting.

[Embodiment 3]

In an embodiment 3, a description will be given of a configuration in which the availability restricting section 14 in the embodiment 1 is replaced with an availability restricting section 14". Configurations other than that of the availability restricting section 14" are the same as those of the embodiment 1, and thus, the description will be given of the configuration of the availability restricting section 14" and an operation of the terminal apparatus 1 using the availability restricting section 14".

Figure 8:
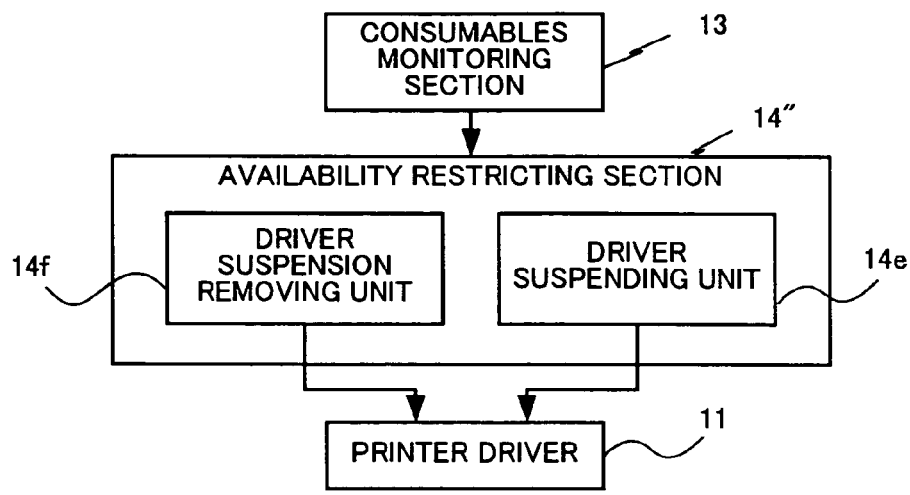
FIG. 8 is a block diagram illustrating a functional configuration of an availability restricting section according to still another embodiment.

FIG. 8 is a block diagram illustrating the functional configuration of the availability restricting section 14". Referring to FIG. 8, the availability restricting section 14" is constituted by a driver suspending unit 14e and a driver suspension removing unit 14f.

The driver suspending unit 14e changes setting of the printer driver 11, and suspends an operation thereof. The driver suspension removing unit 14f reinstates the setting of the printer driver 11, and removes the suspension of the operation. The suspension processing by the driver suspending unit 14e and the driver suspension removal processing by the driver suspension removing unit 14f can suspend or remove the suspension of a part of functions of the printer driver 11 such as a color printing, and stapling in addition to suspending or removing the suspension of the entire functions thereof.

Figure 9:
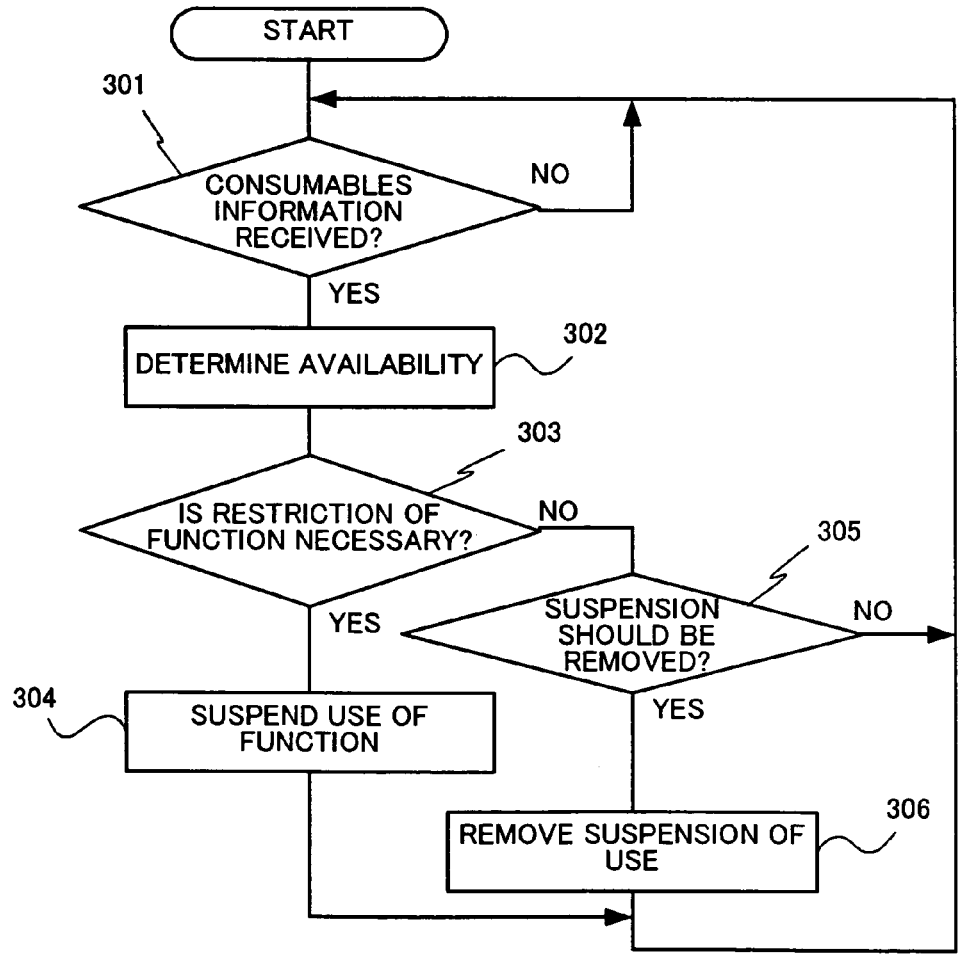
FIG. 9 is a flowchart illustrating a flow of an operation of the terminal apparatus 1 according to still another embodiment.

A description will now be given of the operation of the terminal apparatus 1. FIG. 9 is a flowchart illustrating a flow of the operation of the terminal apparatus 1 according to the embodiment 3.

In the terminal apparatus 1, if the consumables monitoring section 13 receives the information on consumables that is notified by the output apparatus 2 through the network adapter 12 ("YES" in a step 301), the availability restricting section 14" determines the availability of the output apparatus 2 based on the information on consumables (step 302). Although the determination made by the availability restricting section 14" is basically the same as the determination by the availability restricting section 14 in the embodiment 1, the availability is determined for respective functions such as the color printing and stapling in the embodiment 3.

If the availability restricting section 14" determines to prohibit the use of the entire functions or a part of the functions of the output apparatus 2 ("YES" in step 303), the driver suspending unit 14e suspends the restricted functions of the entire functions of the printer driver 11 (step 304). Of course, if the use itself of the output apparatus 2 is prohibited, the entire functions are suspended.

On the other hand, if the availability restricting section 14" determines to remove the suspension of the entire or the part of the suspended functions ("NO" in the step 303, and "YES" in a step 305), the driver suspension removing unit 14f removes the suspension of the functions whose suspension is determined to be removed (step 306).

Further, if the availability restricting section 14" determines not to remove the prohibition of the use or the suspension of the functions ("NO" in the step 303, and "NO" in the step 305), the procedure returns to the step 201, and waits for the reception of another information on consumables.

The entire disclosure of Japanese patent application no. 2004-76903 filed on Mar. 17, 2004 including specification, claims, drawings and abstract is incorporated herein by reference in its entirety.

What is claimed is:

1. A driver management method for managing a driver that is used when an output apparatus is used from a plurality of terminal apparatuses, comprising:

monitoring a state of the output apparatus; and restricting availability of the driver to the plurality of apparatuses, according to the state of the output apparatus wherein the restriction on the availability of the driver is effected by uninstalling the driver.

2. The driver management method according to claim 1, wherein the state of the output apparatus is identified based on a state of consumables for the output apparatus.

3. The driver management method according to claim 2, wherein the restriction on the availability of the driver is effected according to a remaining quantity of the consumables.

4. The driver management method according to claim 2, wherein the restriction on the availability of the driver is effected according to types of the consumables.

5. The driver management method according to claim 1, wherein the restriction on the availability of the driver is removed according to the state of the output apparatus.

6. The driver management method according to claim 1, wherein the restriction on the availability of the driver is effected by uninstalling the driver after backing up the driver in a recoverable state.

7. A driver management apparatus for managing a driver that is used when an output apparatus is used from a plurality terminal apparatuses, comprising:
a monitoring section that monitors a state of the output apparatus; and
an availability restricting section that restricts availability of the driver to the plurality of terminal apparatuses according to the state of the output apparatus monitored by the monitoring section wherein the availability restricting section comprises driver uninstalling unit that uninstalls the driver.

8. The driver management apparatus according to claim 7, wherein the monitoring section identifies the state of the output apparatus based on a state of consumables for the output apparatus.

9. The driver management apparatus according to claim 8, wherein the availability restricting section restricts the availability of the driver according to a remaining quantity of the consumables monitored by the monitoring section.

10. The driver management apparatus according to claim 8, wherein the availability restricting section restricts the availability of the driver according to types of the consumables monitored by the monitoring section.

11. The driver management apparatus according to claim 7, wherein the availability restricting section comprises restriction removing unit that removes the restriction on the availability of the driver according to the state of the output apparatus monitored by the monitoring section.

12. The driver management apparatus according to claim 7, wherein the availability restricting section comprises:
a driver backing-up unit that duplicates the driver, and backs up the duplicate into a recoverable state; and
a driver uninstalling unit that uninstalls the driver backed up by the driver backing-up unit.

13. A program for driver management executable by a computer to perform a function for managing a driver that is used when an output apparatus is used from a plurality of terminal apparatuses, the function comprising the steps of:
monitoring a state of the output apparatus; and
restricting availability of the driver to the plurality of terminal apparatuses according to the state of the output apparatus monitored by the monitoring process wherein the availability restriction step comprises a driver uninstalling step that uninstalls the driver.

14. The program for driver management according to claim 13, wherein the monitoring step identifies the state of the output apparatus based on a state of consumables for the output apparatus.

15. The program for driver management according to claim 14, wherein the availability restricting step restricts the availability of the driver according to a remaining quantity of the consumables monitored by the monitoring step.

16. The program for driver management according to claim 14, wherein the availability restricting step restricts the availability of the driver according to types of the consumables monitored in the monitoring step.

17. The program for driver management according to claim 13, further comprising a restriction removing step for removing the restriction by the availability restricting step according to the state of the output apparatus monitored in the monitoring step.

18. The program for driver management according to claim 13, wherein the availability restricting step comprises:
a driver backing-up step for duplicating the driver, and then, backing up the duplicate into a recoverable state; and
a driver uninstalling step for uninstalling the driver backed up by the driver backing-up step.

* * * * *